(No Model.) 2 Sheets—Sheet 1.

T. G. PALMER & W. H. BUTLER.
COFFEE ROASTER.

No. 360,971. Patented Apr. 12, 1887.

Witnesses:
J. Stail
Chas. H. Smith

Inventors
Timothy G. Palmer
William H. Butler
per L. W. Serrell
Atty (No Model.) 2 Sheets—Sheet 2.

T. G. PALMER & W. H. BUTLER.
COFFEE ROASTER.

No. 360,971. Patented Apr. 12, 1887.

Witnesses:
J. Staib
Chas. H. Smith

Inventors:
Timothy G. Palmer
William H. Butler
per Lemuel W. Serrell
Atty

UNITED STATES PATENT OFFICE.

TIMOTHY G. PALMER, OF SCHULTZVILLE, AND WILLIAM H. BUTLER, OF RHINEBECK, NEW YORK; SAID BUTLER ASSIGNOR TO SAID PALMER.

COFFEE-ROASTER.

SPECIFICATION forming part of Letters Patent No. 360,971, dated April 12, 1887.

Application filed July 19, 1886. Serial No. 208,370. (No model.)

*To all whom it may concern:*

Be it known that we, TIMOTHY G. PALMER, of Schultzville, and WILLIAM H. BUTLER, of Rhinebeck, both in the county of Dutchess and State of New York, have invented an Improvement in Grain-Drying and Coffee-Roasting Apparatus, of which the following is a specification.

Revolving cylinders and revolving cones of perforated materials have been used both in grain-driers and in coffee-roasters.

Our invention is made for exposing the grains or seeds to a gradually-increasing heat, and for protecting such grains or seeds from too-sudden action of the heat, so that with grain that is moist or wet the drying operation can be performed without scorching or injuring the same, and with coffee or other seeds that require to be roasted the operation is gradual, and the roasting can be performed by an increase of heat.

Figure 1:
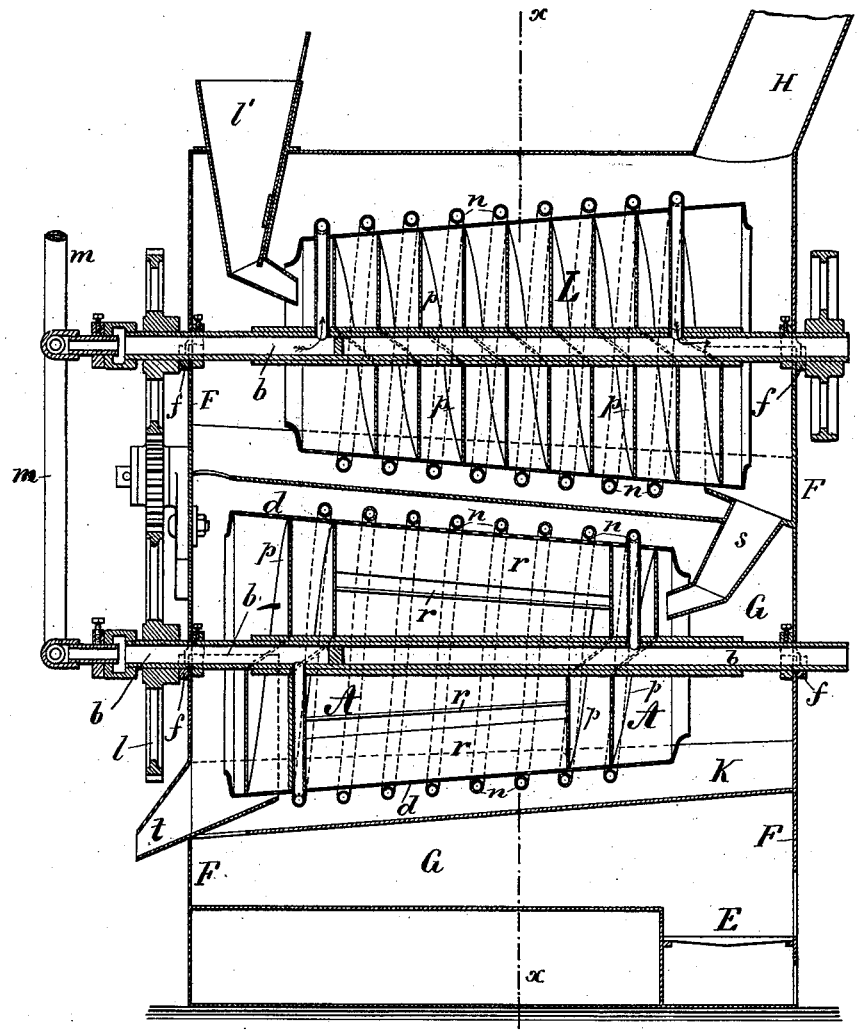
Figure 3:
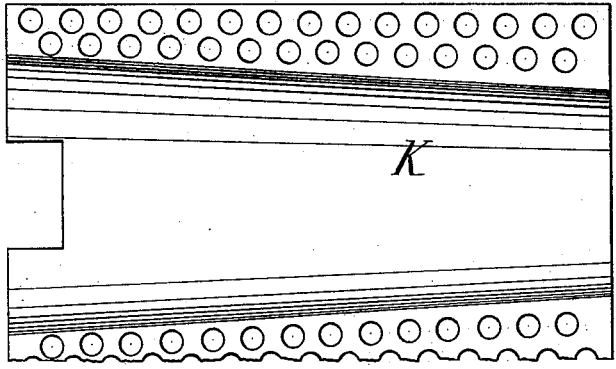
Figure 2:
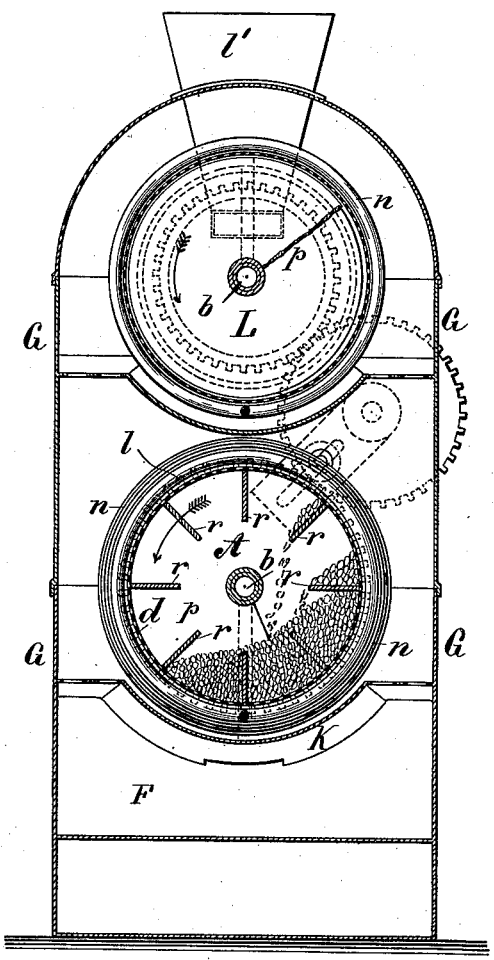

In the drawings, Figure 1 is a vertical section of the apparatus lengthwise of the shafts. Fig. 2 is a transverse section at the line $x$ $x$, and Fig. 3 is a separate plan of the perforated septum.

The revolving drier A is upon a tubular shaft, $b$, and there are supports that connect the shaft with the perforated case $d$, which is preferably of sheet metal; but it may be of fine strong wire-cloth, and such cylinder is preferably smaller at one end than the other.

The furnace or heating device at E is of any suitable size or kind, according to the character of work to be performed; and F are the front and rear walls, and G the side walls, and H is the flue passing off from the top of the inclosure.

Beneath the drier A and above the fire is a septum, K, of sheet-iron, the middle portion of which is curved so as to be parallel to the surface of the cylinder, and there are rows of perforations or openings along the sides. This septum renders the heat uniform and prevents the violent direct action of the heat on the material within the cylinder A, but it allows the heat to pass up around the cylinder A to act upon the contents thereof.

The shaft of the cylinder A is supported in bearings $f$ upon the end walls of the inclosure, and the shaft and cylinder are revolved by suitable power applied to the wheel $l$.

At the end of the shaft $b$ there is a coupling that connects the steam-pipe $m$ to the hollow shaft, but allows it to revolve, and from the shaft there are branches that connect to the spiral coil $n$ of pipe around the outside of the cylinder, and both ends of this coil are thus connected to the shaft, so that as the coil revolves with the drier A the steam-heat will act all around the mass of grain in the cylinder to dry the same, and the fire-heat will act first upon the steam-pipes to prevent the steam condensing in such pipes; but should there be condensation it will run out by the well-known travel of the water along the revolving spiral tube, and the water of condensation passes off through the other end of the tubular shaft. The tubular shaft has a plug or stopper in it between the two branches that lead to the spiral coil $n$, so as to compel the steam to pass through such coil. The grain or other materials are supplied into this drying-cylinder by the chute $s$, and delivered by the chute $t$, and within the cylinder A there are spiral or screw formed blades $p$, near the two ends, that aid in passing the grain along from one end of the cylinder to the other, and there are lifting-shelves $r$ around the inside of the cylinder, to lift up the grain and allow it to pour off in a shower and fall upon the lower inner part of the cylinder, thus giving opportunity for the moisture to pass off freely.

Where two or more cylinders are made use of, the upper one, L, corresponds to the lower cylinder, A, in all respects, except that it is generally preferable to extend the spiral $p$ all through such cylinder. We have shown two such cylinders, the grain or seeds being supplied first into the top chute, $l'$, and passing through the cylinder L, and thence going off at the larger end into the chute $s$, and from there to the cylinder A.

In consequence of the spiral blades in the cylinders extending from the perforated sheet-metal case to the shaft, there are complete spiral channels formed, through which the grain is compelled to travel and cannot escape until it reaches the ends of the spirals, and this is the case when the spirals extend the whole or only a portion of the length of the cylinder.

We claim as our invention—

1. The combination, with the revolving perforated drying-cylinder and its revolving tubular shaft, of a spiral coil of pipe around the exterior of the drying-cylinder, connections from the coil to the tubular shaft, and steam-supply pipe connected to the shaft so that the coil, cylinder, and shaft revolve together, substantially as set forth.

2. The combination, with the fire-chamber and the septum K above the same, having openings therein, of a revolving cylinder and its tubular shaft above the septum, a steam-coil surrounding the cylinder and connections from the coil to the shaft, and a steam-supply pipe, whereby the steam-coil intervenes between the cylinder and the heat from the fire-chamber, substantially as specified.

Signed by us this 2d day of July, A. D. 1886.

TIMOTHY G. PALMER.
WM. H. BUTLER.

Witnesses:
GEO. T. PINCKNEY,
WILLIAM G. MOTT.